(12) United States Patent
Suzuki

(10) Patent No.: US 7,570,284 B2
(45) Date of Patent: Aug. 4, 2009

(54) WHITE BALANCE ADJUSTMENT CIRCUIT AND IMAGE-CAPTURING APPARATUS

(75) Inventor: Kenji Suzuki, Kawasaki (JP)

(73) Assignee: Nikon Corporation, Tokyo (JP)

( * ) Notice: Subject to any disclaimer, the term of this patent is extended or adjusted under 35 U.S.C. 154(b) by 692 days.

(21) Appl. No.: 10/798,327

(22) Filed: Mar. 12, 2004

(65) Prior Publication Data

US 2004/0179113 A1    Sep. 16, 2004

(30) Foreign Application Priority Data

Mar. 13, 2003  (JP) ............................ 2003-067980

(51) Int. Cl.
*H04N 9/73* (2006.01)
(52) U.S. Cl. ................. 348/223.1; 348/225.1
(58) Field of Classification Search .............. 348/224.1, 348/223.1, 225.1, 227.1, 228.1
See application file for complete search history.

(56) References Cited

U.S. PATENT DOCUMENTS 4,774,564 A * 9/1988 Konishi .................. 348/224.1
4,883,360 A * 11/1989 Kawada et al. ............ 348/228.1
4,899,212 A * 2/1990 Kaneko et al. ............ 348/220.1
5,019,894 A * 5/1991 Hieda et al. ............... 348/224.1
5,691,772 A * 11/1997 Suzuki ..................... 348/223.1
6,621,519 B2 * 9/2003 Nakayama et al. ........ 348/223.1

FOREIGN PATENT DOCUMENTS

| JP | A-9-214983 | 8/1997 |
| JP | A 11-341500 | 12/1999 |
| JP | A-2000-299876 | 10/2000 |
| JP | A-2001-258048 | 9/2001 |

* cited by examiner

*Primary Examiner*—David L Ometz
*Assistant Examiner*—Luong T Nguyen
(74) *Attorney, Agent, or Firm*—Oliff & Berridge, PLC

(57) ABSTRACT

Image-capturing signal lines through which image-capturing signals are output from an image-capturing element include separate lines, i.e., an image-capturing signal line corresponding to G color and an image-capturing signal line corresponding to R color and B color. The level of the G color image-capturing signal is adjusted at a first gain circuit, whereas the levels of the image-capturing signals corresponding to R color and B color are adjusted at a second gain circuit.

15 Claims, 3 Drawing Sheets

FIG. 3

| | ELEMENT OUTPUT LEVEL | | | R AND B GAINS RELATIVE TO G | | OUTPUT LEVELS AT GAIN ADJUSTMENT CIRCUIT | | | R AND B GAINS RELATIVE TO G | |
|---|---|---|---|---|---|---|---|---|---|---|
| | R | G | B | G/R | G/B | R | G | B | G/R | G/B |
| 3000K | 522 | 600 | 333 | 1.15 | 1.80 | 522 | 600 | 333 | 1.15 | 1.80 |
| 4000K | 400 | 600 | 429 | 1.50 | 1.40 | 400 | 600 | 429 | 1.50 | 1.40 |
| 5000K | 333 | 600 | 522 | 1.80 | 1.15 | 333 | 600 | 522 | 1.80 | 1.15 |
| 6000K | 300 | 600 | 583 | 2.00 | 1.03 | 300 | 600 | 583 | 2.00 | 1.03 |
| 7000K | 286 | 600 | 632 | 2.10 | 0.95 | 200 | 600 | 442 | 3.00 | 1.35 |
| 8000K | 293 | 600 | 667 | 2.05 | 0.90 | 205 | 600 | 467 | 2.92 | 1.28 |

31, 32, 33, 34

WHITE BALANCE ADJUSTMENT CIRCUIT AND IMAGE-CAPTURING APPARATUS

The disclosure of the following priority application is herein incorporated by reference: Japanese Patent Application No. 2003-067980 filed Mar. 13, 2003

BACKGROUND OF THE INVENTION

1. Field of the Invention

The present invention relates to a white balance adjustment circuit and an image-capturing apparatus that includes the white balance adjustment circuit.

2. Description of the Related Art

In an electronic camera that captures a subject image having passed through a photographic lens by using an image-capturing element such as a CCD image sensor, a white balance adjustment is executed in order to achieve a predetermined ratio among the signal levels of image-capturing signals corresponding to R, G and B colors obtained from the CCD image sensor. Under normal circumstances, the gain to be applied to the R color signals and the gain to be applied to the B color signals are determined relative to the G color signal gain in the white balance adjustment. Japanese Laid Open Patent Publication No. H 11-341500 (hereafter referred to as reference literature 1) discloses an image-capturing apparatus that executes a white balance correction (coarse adjustment which will be described below) together with the white balance adjustment described above when there is a change in a photographing condition. In this image-capturing apparatus, the white balance is corrected in conformance to whether or not an ND filter is currently inserted between the photographic lens and the image-capturing element.

The image-capturing apparatus disclosed in reference literature 1 corrects (coarse adjustment) the G color signal gain in conformance to whether or not the ND filter is currently inserted and the gains for the R color signals and the B color signals are determined (finely adjusted) relative to the corrected G color signal gain. Generally speaking, the G color signals are often utilized to obtain brightness information in exposure calculation and, for this reason, there is the risk of the exposure becoming changed if the G color signal gain is adjusted.

SUMMARY OF THE INVENTION

It is desirable to provide a white balance adjustment circuit capable of executing white balance adjustment without altering the gain of image-capturing signals corresponding to a first color (e.g., G color).

A white balance adjustment circuit according to the present invention includes a first gain adjuster that adjusts the signal level of a second image-capturing signal provided by an image-capturing element which captures a subject image through a spectroscopic element and outputs a first image-capturing signal corresponding to a first color, the second image-capturing signal corresponding to a second color and a third image-capturing signal corresponding to a third color, a second gain adjuster that adjusts the signal level of the third image-capturing signal provided by the image-capturing element and a white balance adjuster that adjusts the signal ratio among the first image-capturing signal, the second image-capturing signal having been adjusted by the first gain adjuster and the third image-capturing signal having been adjusted by the second gain adjuster to achieve a predetermined ratio.

The white balance adjustment circuit may further include a color temperature detector that detects the color temperature of the subject and an instructing device that issues individual instructions for the first gain adjuster and the second gain adjuster to perform adjustment in correspondence to the color temperature detected by the color temperature detector.

The instructing device may issue instructions for the first gain adjuster and the second gain adjuster to set respective gains to predetermined initial values if the color temperature detected by the color temperature detector is lower than a predetermined value and may issue instructions for the first gain adjuster and the second gain adjuster to set the gains lower than the respective initial values if the color temperature is equal to or higher than the predetermined value.

The white balance adjustment circuit may further include a third gain adjustor that adjusts the signal level of the first image-capturing signal provided by the image-capturing element and a brightness detector that detects the brightness of the subject. In such a case, the instructing device may issue an instruction for the third gain adjuster to set a gain adjusted thereby to a predetermined initial value if the brightness detected by the brightness detector is equal to or higher than a predetermined brightness value and may issue an instruction for the third gain adjuster to set the gain higher than the initial value if the detected brightness level is lower than the predetermined brightness value.

A white balance adjustment circuit according to the present invention includes a first gain adjuster that adjusts the signal level of a first image-capturing signal provided by an image-capturing element which captures a subject image through a spectroscopic element and outputs the first image-capturing signal corresponding to a first color, a second image-capturing signal corresponding to a second color and a third image-capturing signal corresponding to a third color, a second gain adjuster that adjusts the signal level of the second image-capturing signal provided by the image-capturing element, a third gain adjuster that adjusts the signal level of the third image-capturing signal provided by the image-capturing element, a signal level detector that individually detects the signal levels of the first image-capturing signal having been adjusted by the first gain adjuster, the second image-capturing signal having been adjusted by the second gain adjuster and the third image-capturing signal having been adjusted by the third gain adjuster, and a white balance controller that individually controls the first gain adjuster, the second gain adjuster and the third gain adjuster so as to achieve a predetermined ratio among the individual image-capturing signal levels detected by the signal level detector.

The white balance adjustment circuit may further include a color temperature detector that detects the color temperature of the subject and an instructing device that issues individual instructions for the second gain adjuster and the third gain adjuster to perform adjustment in correspondence to the color temperature detected by the color temperature detector. The instructing device may issue instructions for the second gain adjuster and the third gain adjuster to set respective gains to predetermined initial values if the color temperature detected by the color temperature detector is lower than a predetermined value and may issue instructions for the second gain adjuster and the third gain adjuster to set the gains lower than the respective initial values if the color temperature is equal to or higher than the predetermined value.

The white balance adjustment circuit may further include a brightness detector that detects the brightness of the subject. In such a case, the instructing device may issue an instruction for the first gain adjuster to set a gain adjusted thereby to a predetermined initial value if the brightness detected by the brightness detector is equal to or higher than a predetermined brightness value and may issue an instruction for the first gain adjuster to set the gain higher than the initial value if the detected brightness level is lower than the predetermined brightness value.

The first color mentioned above is G color and either one of the second color and the third color is R color and the other is B color.

The image-capturing apparatus according to the present invention includes either of the white balance adjustment circuits described above.

BRIEF DESCRIPTION OF THE DRAWINGS

FIG. 3 presents examples of ratios among the individual colors represented by image-capturing signals that may be set in correspondence to various color temperatures.

DETAILED DESCRIPTION OF THE PREFERRED EMBODIMENT

The following is an explanation of an embodiment of the present invention, given in reference to the drawings.

Figure 1:
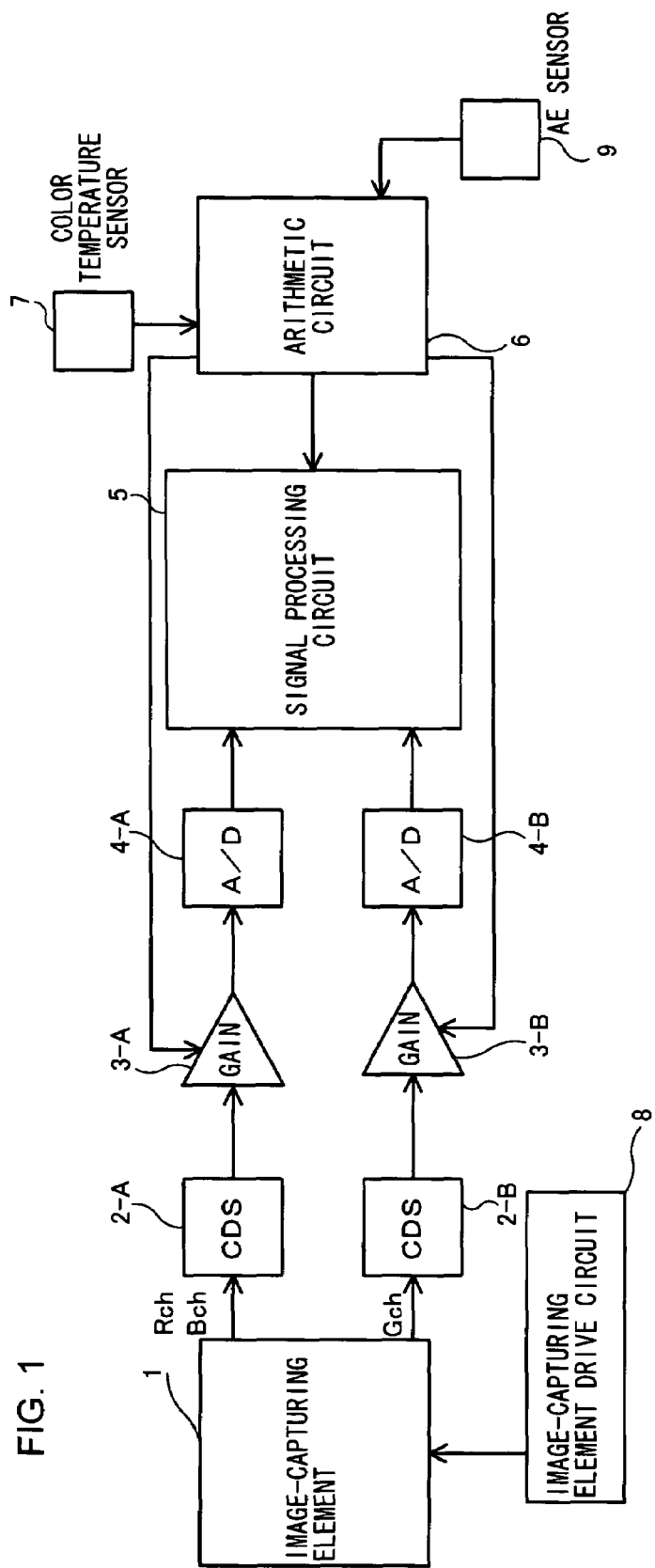
FIG. 1 is a block diagram showing the essential structure adopted in the image-capturing unit of the electronic still camera achieved in an embodiment of the present invention.

FIG. 1 is a block diagram showing the essential structure adopted in the image-capturing unit of an electronic still camera equipped with a white balance adjustment circuit according to the present invention. The image-capturing unit in FIG. 1 includes an image-capturing element 1, a first CDS circuit 2-B, a first gain circuit 3-B, a first A/D conversion circuit 4-B, a second CDS circuit 2-A, a second gain circuit 3-A, a second A/D conversion circuit 4-A, a signal processing circuit 5, an arithmetic circuit 6, a color temperature sensor 7, an image-capturing element drive circuit 8 and an AE sensor 9.

The image-capturing element 1 may be constituted of, for instance, a two-dimensional CCD image sensor. The CCD image sensor stores signal charges in correspondence to the individual pixels disposed at an image-capturing surface, in conformance to the brightness of the subject image formed on the image-capturing surface by a lens (not shown).

A vertical drive pulse signal and a horizontal drive pulse signal are individually provided by the image-capturing element drive circuit 8 to the image-capturing element 1. The electrical charges stored in correspondence to the individual pixels at the image-capturing element 1 are first vertically transferred in response to the vertical drive pulse signal and then are horizontally transferred in response to the horizontal drive pulse signal. The stored charges having been horizontally transferred are sequentially output from the image-capturing element 1 to the first CDS circuit 2-B and the second CDS circuit 2-A.

A color filter (not shown) is disposed over the pixel area at the image-capturing element 1. The color filter is a color separation filter adopting the Bayer system achieved by disposing primary color filters, each of which allows light corresponding to R color, B color or G color to be transmitted in a checkered pattern reflecting the positions of the individual pixels. By capturing the subject image through the color filter achieved as described above, the image-capturing element 1 outputs image-capturing signals each corresponding to R color, B color or G color.

In the embodiment, there are two systems each including the vertical transfer mechanism and the horizontal transfer mechanism employed to transfer the stored electrical charges so that the image-capturing signals corresponding to R color and B color (Rch and Bch) are output separately from the image-capturing signals corresponding to G color (Gch). As a result, the image-capturing signals corresponding to the G color light are output from the image-capturing element 1 to the first CDS circuit 2-B, whereas the image-capturing signals corresponding to the R color light and the B color light are output from the image-capturing element 1 to the second CDS circuit 2-A.

The first CDS circuit 2-B and the second CDS circuit 2-A remove noise contained in the image-capturing signals input thereto. The image-capturing signals from which noise has been removed are respectively output to the first gain circuit 3-B and the second gain circuit 3-A.

The first gain circuit 3-B and the second gain circuit 3-A execute gain adjustment on the respective image-capturing signals input thereto. Namely, the gain circuits 3-A and 3-B respectively change the gains (signal amplification factors) in conformance to instructions issued by the arithmetic circuit 6. The image-capturing signals having undergone the gain adjustment, which are analog signals, are then converted to digital signals at the first A/D conversion circuit 4-B and the second A/D conversion circuit 4-A respectively. The image data having undergone the digital conversion, which have been generated through the two separate systems, are individually input to the signal processing circuit 5.

The signal processing circuit 5 synthesizes the image data corresponding to the G color input from the first A/D conversion circuit 4-B and the image data corresponding to R color and B color input from the second A/D conversion circuit 4-A on a single image plane. The signal processing circuit 5 further executes image processing such as the gamma correction and white balance adjustment on the image data. The image data having undergone the image processing are recorded into a recording medium such as a memory card (not shown) after they are processed into a predetermined recording format, or they are processed to generate image data for display at a display monitor (not shown) and are output as display image data.

The signal processing circuit 5 executes the white balance adjustment by adopting the following method. An R gain and a B gain for white balance adjustment are applied respectively to the image data corresponding to the R color and the image data corresponding to the B color input from the second A/D conversion circuit 4-A. The R gain and the B gain for the white balance adjustment are determined at the arithmetic circuit 6.

The arithmetic circuit 6 executes an arithmetic operation to determine numerical values needed in the white balance adjustment executed at the signal processing circuit 5 and an arithmetic operation to enable the first gain circuit 3-B and the second gain circuit 3-A to perform gain adjustment (coarse adjustment). A detection signal indicating the color temperature of the subject detected by the color temperature sensor 7 and a detection signal indicating the subject brightness detected by the AE sensor 9 are individually input to the arithmetic circuit 6.

The color temperature sensor 7 may be constituted of, for instance, a two-dimensional image-capturing element having a plurality of pixels. Primary color filters (not shown), each of which allows light in one of the three primary colors, i.e., R color, G color and B color, are disposed at the surface of the color temperature sensor 7, each in correspondence to one of the plurality of pixels. As the color temperature sensor 7 captures the subject light through these color filters, the subject light is separated into R color signals, G color signals or B color signals. In other words, the color temperature sensor 7 outputs a detection signal indicating the signal ratio of the R color component, the G color component and the B color component in the subject light to the arithmetic circuit 6. It is to be noted that the number of pixels at the color temperature sensor 7 is smaller than the number of pixels provided at the image-capturing element 1 utilized in photographic operations.

Based upon the detection signal output from the color temperature sensor 7, the arithmetic circuit 6 calculates the color temperature. Under normal circumstances, the color temperature has a specific relationship between the ratio G/R of the G color signal level and the R color signal level and the ratio G/B of the G color signal level and the B color signal level. Accordingly, a table of values representing the relationship among the color temperature, the signal level ratio G/R and the signal level ratio G/B is stored in advance in the arithmetic circuit 6, and by first ascertaining the image-capturing signal level ratio G/R and the image-capturing signal level ratio G/B in the subject light and then referencing the table, the color temperature is obtained.

The arithmetic circuit 6 also calculates white balance adjustment coefficients based upon the detection signal output by the color temperature sensor 7. In the arithmetic circuit 6, a table of values representing the relationship among the image-capturing signal level ratio G/R, the image-capturing signal level ratio G/B and the white balance adjustment coefficients (R gain and B gain) are stored in advance. The R gain and the B gain to be used in the white balance adjustment is determined by ascertaining the image-capturing signal level ratio G/R and the signal level ratio G/B in the subject light and then referencing the table.

The R gain value and the B gain value used in the white balance adjustment are, for instance, values that achieve a ratio 1:1:1 for the color signal component corresponding to R color, B color and G color when an image of an achromatic subject, e.g., a white or gray subject, is captured by the image-capturing element 1.

The white balance adjustment coefficients described above are calculated sequentially by using the detection signal output by the color temperature sensor 7 prior to a shutter release. As the photographic subject image is captured by the image-capturing element 1 following the shutter release, the signal processing circuit 5 executes white balance adjustment on image-capturing signals output from the image-capturing element 1 by using the white balance adjustment gains calculated by the arithmetic circuit 6.

In addition, the arithmetic circuit 6 calculates the brightness level of the subject through a specific photometering arithmetic operation executed based upon the detection signal output from the AE sensor 9. The subject brightness thus calculated is used in exposure calculation executed as in the known art.

The image-capturing element drive circuit 8 generates a drive signal used to enable the image-capturing element 1 to nullify any unnecessary charge, a drive signal used to enable the image-capturing element 1 to store electrical charges and a drive signal used to enable the image-capturing element 1 to output the stored electrical charges, and provides those drive signals to the image-capturing element 1. The image-capturing element drive circuit 8 starts providing a drive signal to the image-capturing element 1 in response to an operational instruction input from a control circuit (not shown).

The white balance adjustment circuit achieved in the embodiment executes gain adjustment on the image-capturing signals corresponding to R color and B color in addition to the white balance adjustment executed by the signal processing circuit 5.

Figure 2:
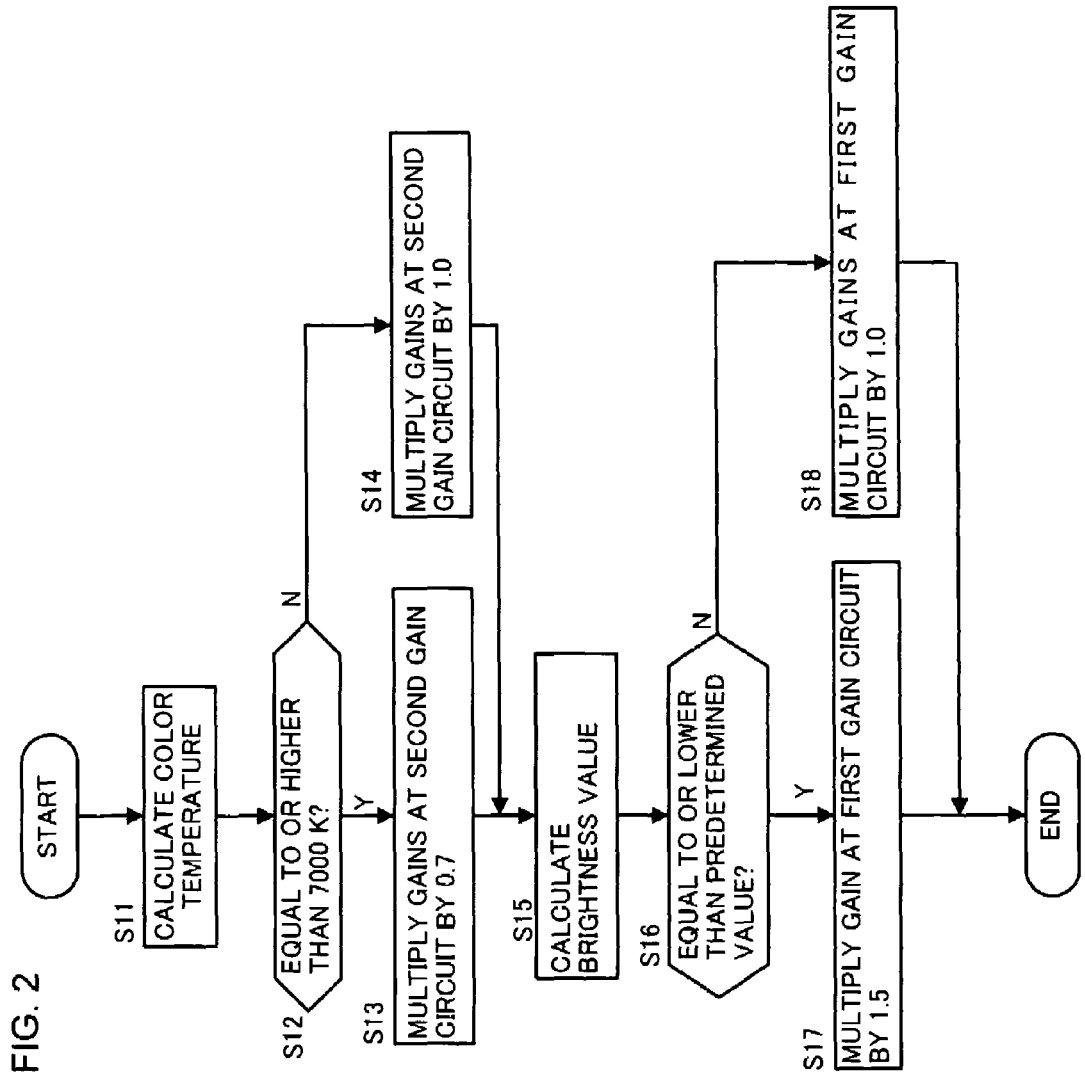
FIG. 2 presents a flowchart of the gain-determine processing.

An explanation is now given in reference to the flowchart presented in FIG. 2 on the gain-determine processing executed to enable the gain adjustment by the first gain circuit 3-B and the second gain circuit 3-A. The processing in the flowchart presented in FIG. 2 is repeatedly executed by the arithmetic circuit 6 prior to a shutter release.

In step S11, the arithmetic circuit 6 calculates the color temperature based upon the detection signal output by the color temperature sensor 7. After the color temperature is calculated, the operation proceeds to step S12.

In step S12, the arithmetic circuit 6 makes a decision as to whether or not the color temperature is equal to or higher than 7000 K. The operation proceeds to step S13 if the color temperature is judged to be equal to or higher than 7000 K., whereas the operation proceeds to step S14 if the color temperature is judged to be lower than 7000 K.

In step S13, the arithmetic circuit 6 sets 0.7 for the gain at the second gain circuit 3-A, and then the operation proceeds to step S15. It is to be noted that the gains are both set in advance to an initial value of 1.0 at the first gain circuit 3-B and the second gain circuit 3-A. Thus, by adjusting the gain to 0.7 for the second gain circuit 3-A, the signal levels of the image-capturing signal corresponding to the R color light and the image-capturing signal corresponding to the B color light provided by the image-capturing element 1 are each coarsely adjusted to 70% of the signal level achieved at the initial gain value setting.

In step S14, the arithmetic circuit 6 sets the gain at the second gain circuit 3-A to 1.0, before the operation proceeds to step S15. As a result, the signal levels of the image-capturing signals corresponding to the R color light and the image-capturing signals corresponding to the B color light provided by the image-capturing element 1 are each set to the signal level achieved at the initial gain value setting.

In step S15, the arithmetic circuit 6 calculates the brightness level of the subject based upon the detection signal output by the AE sensor 9. Once the subject brightness is calculated, the operation proceeds to step S16. In step S16, the arithmetic circuit 6 makes a decision as to whether or not the subject brightness level calculated in step S15 is equal to or lower than a predetermined value. The operation proceeds to step S17 if the subject brightness is judged to be equal to or lower than the predetermined value, whereas the operation proceeds to step S18 if the subject brightness is judged to exceed the predetermined value.

In step S17, the arithmetic circuit 6 sets the gain at the first gain circuit 3-B to 1.5, and then, the processing shown in the flowchart in FIG. 2 ends. As a result, the signal level of the image-capturing signals corresponding to the G color light from the image-capturing element 1 becomes coarsely adjusted to a level which is 1.5 times as high as the signal level achieved at the initial gain value setting.

In step S18, the arithmetic circuit 6 sets the gain at the first gain circuit 3-B to 1.0, and then the processing in the flowchart in FIG. 2 ends. As a result, the signal level of the image-capturing signal corresponding to the G color light provided by the image-capturing element 1 is set to the signal level achieved at the initial gain value setting.

FIG. 3 presents examples of ratios of different colors represented by the image-capturing signals, that may be achieved in correspondence to various color temperatures. FIG. 3 shows output levels 31 of the image-capturing signals corresponding to R, G and B colors from the image-capturing element 1, signal level ratios 32, i.e., the signal level ratio G/R and the signal level ratio G/B, calculated based upon the image-capturing signal levels corresponding to the individual colors, output levels 33 of the image-capturing signals corresponding to R, G and B colors output by the respective gain circuits after the gain adjustment described above and signal level ratios 34, i.e., the signal level ratio G/R and the signal level ratio G/B, calculated based upon the levels of the image-capturing signals having undergone the gain adjustment. In the output levels 31 and the output levels 33, the G color signal level is set to 600 and the R color signal level and B color signal level individually indicate the signal level relative to the G color signal level.

Over the color temperature range of 3000 K. to 7000 K., the gains at the first gain circuit 3-B and the second gain circuit 3-A are all set to the initial value of 1.0, and for this reason, the output levels 31 of the image-capturing signals provided by the image-capturing element 1 and the output levels 33 of the image-capturing signals provided by the gain adjustment circuits are the same.

Over the color temperature range of 7000 K. to 8000 K., the output levels of the image-capturing signals corresponding to the R color light and the B color light are both coarsely adjusted so that the output levels 33 corresponding to R color and B color after the gain adjustment are 0.7 times the respective output levels 31 prior to the gain adjustment. It is to be noted that the gain is not adjusted for the G color light, and for this reason, the output level 31 of the image-capturing signals corresponding to G color from the image-capturing element 1 is equal to the output level 33 of the image-capturing signals corresponding to G color after the gain adjustment.

The following advantages are achieved by utilizing the white balance adjustment circuit in the embodiment.

(1) The image-capturing signals are output from the image-capturing element 1 on separate signal lines, i.e., the image-capturing signal line (Gch) corresponding to G color and the image-capturing signal line (Rch and Bch) corresponding to R color and B color, and, as a result, the gains of the image-capturing signals corresponding to R color and B color can be adjusted independently of the image-capturing signal gain for G color. Thus, it is possible to achieve a specific relationship between the G color image-capturing signal level and the image-capturing signal levels corresponding to R color and B color before executing the white balance adjustment at the signal processing circuit 5. For instance, even when the color temperature is inconsistent over the photographic image plane and the ratio of the G color image-capturing signal level, the R color image-capturing signal level and the B color image-capturing signal level fluctuate significantly, the signal levels corresponding to the individual colors can be set closer to one another through coarse adjustment. Since this coarse adjustment eliminates the need for the signal processing circuit 5 to execute a wide range adjustment, an advantage is achieved in that the white balance adjustment processing can be executed as high speed.

(2) In addition to the advantage described in (1), tinting that may occur when the level of image-capturing signals corresponding to a given color becomes high is prevented. When the color temperature is high (e.g., 7000 K. in FIG. 3), the signal level corresponding to the B color component rises to exceed the G color signal level. In such a situation, it becomes necessary to multiply the B color image-capturing signals by an adjustment coefficient smaller than 1 during the white balance adjustment. When image-capturing signals are multiplied by an adjustment coefficient smaller than 1, the level of the image-capturing signals having undergone the multiplication processing becomes lower than the level of the signals output by the image-capturing element 1. For instance, if the maximum value (signal saturation level) of the image-capturing signals output by the image-capturing element 1 is 4000, the level of the image-capturing signals multiplied by the adjustment coefficient smaller than 1 is less than 4000.

As explained earlier, the white balance adjustment is executed to achieve a ratio of 1:1:1 for the color signal components corresponding to R color, B color and G color. When the image-capturing signal levels rise and the levels of the image-capturing signals output from the image-capturing element 1 corresponding to the individual colors all reach the signal saturation level of 4000, a very bright "white" can be expressed with the image-capturing signals having undergone the white balance adjustment as long as the levels of the image-capturing signals corresponding to the individual colors after the multiplication processing are all equal to or greater than 4000. However, if the level of the B color image-capturing signals having undergone the multiplication processing described above is less than 4000, the B color signal level becomes lower than the G color and R color signal levels, and thus, "white" cannot be expressed after the white balance adjustment, which induces the so-called tinting phenomenon. In the embodiment, the gain for Bch is lowered to 0.7 when the color temperature is equal to or higher than 7000 K. (step S13 in FIG. 2), thereby achieving a coarse adjustment to set the B color image-capturing signal level lower than the G color image-capturing signal level. Accordingly, the signal processing circuit 5 adopts a structure that allows it to execute multiplication by using adjustment coefficients larger than 1 at all times, and thus, the tinting phenomenon can be prevented through the white balance adjustment. It is to be noted that the image-capturing signal levels rise when the subject brightness is high or when electrical charges are stored over a great length of time.

(3) In addition to the advantages described in (1) and (2) above, an advantage is achieved in that the structure of the signal processing circuit 5 is simplified. Generally speaking, a circuit that performs multiplication by using adjustment coefficients larger than 1 at all times is allowed to assume a structure simpler than that of a circuit engaged in both multiplication executed by adjustment coefficients larger than 1 and multiplication executed by using adjustment coefficients smaller than 1. Accordingly, the gain for Bch is lowered to 0.7 when the color temperature is equal to or higher that 7000 K., thereby achieving a coarse adjustment to set the B color image-capturing level lower than the G color image-capturing in the embodiment. As a result, signal processing circuit 5 is able to adopt a structure that allows it to execute multiplication by using adjustment coefficients larger than 1 at all times, and thus, a cost reduction is achieved.

(4) Since the gains for Bch and Rch are adjusted only under a predetermined condition (when the color temperature is equal to or higher than 7000 K.), the extent to which S/N becomes degraded due to lowered gain can be minimized.

(5) The G color image-capturing signal gain remains unchanged when the color signal levels are coarsely adjusted. Thus, the exposure is not affected when the G color signals are used to detect the brightness for exposure calculation. In other words, the exposure is not affected by the color temperature.

(6) When the subject brightness is equal to or lower than the predetermined value, the gain for Gch is raised to 1.5 (step S17 in FIG. 2), thereby achieving a coarse adjustment to further raise the G color image-capturing signal level. For the white balance adjustment, the signal processing circuit 5 executes the multiplication processing on the B color image-capturing signals and the R color image-capturing signals by using the corresponding white balance adjustment coefficients in reference to the level of the G color signals after the coarse adjustment. As a result, the exposure can be adjusted without having to alter the shutter speed or the aperture value.

The above described embodiment is an example, and various modifications can be made without departing from the spirit and scope of the invention. For instance, the color filter at the image-capturing element 1 does not need to be constituted with primary color filters corresponding to R, G and B colors as described above, and instead, complementary color filters each corresponding to cyan, magenta or yellow may constitute the color filter. In addition, an array other than the Bayer array may be adopted for the color filter arrangement.

While Rch and Bch share a common signal line in the example described above, separate signal lines may be provided in correspondence to Rch and Bch, instead. In the latter case, the coarse adjustment may be executed for at least either Rch or Bch.

The white balance adjustment executed at the signal processing circuit 5 may instead be achieved by utilizing gain circuits. In such a case, a gain circuit (G) for the G color image-capturing signal, a gain circuit (R) for the R color image-capturing signal and a gain circuit (B) for the B color image-capturing signal should be provided to vary the gains for the R color image-capturing signal and the B color image-capturing signal independently of the gain set for the G color image-capturing signal when executing the coarse adjustment and the white balance adjustment. During the coarse adjustment, the arithmetic circuit 6 issues gain instructions for the gain circuit (G), the gain circuit (B) and the gain circuit (R) based upon the color temperature. During the white balance adjustment, the arithmetic circuit 6 calculates white balance adjustment coefficients and issues gain instructions for the gain circuit (G), the gain circuit (B) and the gain circuit (R) based upon the calculated the white balance adjustment coefficients. The individual gain circuits, in turn, execute gain adjustment for the image-capturing signals of corresponding colors based upon the gains indicated by the arithmetic circuit 6.

An explanation is given above in reference to the embodiment on an example in which the image-capturing element 1 obtains the first through third color signals through the color filter. Instead, photoelectric conversion elements corresponding to the individual colors may each be constituted by disposing a silicon layer or the like at which light penetrates to a specific depth depending upon the color (the wavelength) of the light over photodiodes constituting pixels corresponding to the specific color, and such photoelectric conversion elements corresponding to the different colors may be set in layers to obtain the first through third color signals.

What is claimed is;

1. A white balance adjustment circuit comprising:
   a first gain adjuster that adjusts a signal level of a second analog image-capturing signal based on a color temperature of a subject, the second image-capturing signal being provided by an image-capturing element which captures an image of a subject through a spectroscopic element and outputs a first analog image-capturing signal corresponding to a first color, the second analog image-capturing signal corresponding to a second color and a third analog image-capturing signal corresponding to a third color;
   a second gain adjuster that adjusts a signal level of the third analog image-capturing signal based on the color temperature of the subject, the third analog image-capturing signal being provided by the image-capturing element;
   an A/D converter that performs A/D conversion of:
      the first analog image-capturing signal to output a first digital image-capturing signal,
      the second analog image-capturing signal adjusted by the first gain adjuster to output a second digital image-capturing signal, and
      the third analog image-capturing signal adjusted by the second gain adjuster to output a third digital image-capturing signal; and
   a white balance adjuster that adjusts a signal ratio among the first digital image-capturing signal, the second digital image-capturing signal having been adjusted by the first gain adjuster, and the third digital image-capturing signal having been adjusted by the second gain adjuster to achieve a predetermined ratio, wherein
   the white balance adjuster multiplies each of the first, the second and the third digital image-capturing signals by an adjustment coefficient larger than 1.

2. A white balance adjustment circuit according to claim 1, further comprising:
   a color temperature detector that detects the color temperature of the subject; and
   an instructing device that issues individual instructions for the first gain adjuster and the second gain adjuster to perform adjustment in correspondence to the color temperature detected by the color temperature detector.

3. A white balance adjustment circuit according to claim 2, wherein:
   when the color temperature detected by the color temperature detector is lower than a predetermined value, the instructing device issues instructions for the first gain adjuster and the second gain adjuster to set respective gains to predetermined initial values and when the color temperature is equal to or higher than the predetermined value, the instructing device issues instructions for the first gain adjuster and the second gain adjuster to set the gains lower than the respective initial predetermined values.

4. A white balance adjustment circuit according to claim 2, further comprising:
   a third gain adjuster that adjusts a signal level of the first analog image-capturing signal provided by the image-capturing element; and
   a brightness detector that detects a brightness level of the subject, wherein:
   when the brightness detected by the brightness detector is equal to or higher than a predetermined brightness value, the instructing device issues an instruction for the third gain adjuster to set a gain adjusted thereby to a predetermined initial value and when the brightness level is lower than the predetermined brightness value, the instruction device issues an instruction for the third gain adjuster to set the gain higher than the predetermined initial value.

5. A white balance adjustment circuit according to claim 3, further comprising:
   a third gain adjuster that adjusts a signal level of the first analog image-capturing signal provided by the image-capturing element; and
   a brightness detector that detects a brightness level of the subject, wherein:
   when the brightness detected by the brightness detector is equal to or higher than a predetermined brightness value, the instructing device issues an instruction for the third gain adjuster to set a gain adjusted thereby to a predetermined initial value and when the brightness level is lower than the predetermined brightness value, the instruction device issues an instruction for the third gain adjuster to set the gain higher than the predetermined initial value.

6. A white balance adjustment circuit according to claim 1, wherein:
the first color is G color, and one of either the second color or the third color is R color and the other is B color.

7. A white balance adjustment circuit comprising:
a first gain adjuster that adjusts a signal level of a first analog image-capturing signal based on a color temperature of a subject, the first analog image-capturing signal being provided by an image-capturing element which captures an image of a subject through a spectroscopic element and outputs the first analog image-capturing signal corresponding to a first color, a second analog image-capturing signal corresponding to a second color and a third analog image-capturing signal corresponding to a third color;
a second gain adjuster that adjusts a signal level of the second analog image-capturing signal based on the color temperature of the subject, the second analog image-capturing signal being provided by the image-capturing element;
a third gain adjuster that adjusts a signal level of the third analog image-capturing signal based on the color temperature of the subject, the third analog image-capturing signal being provided by the image-capturing element;
a signal level detector that individually detects the signal level of the first analog image-capturing signal having been adjusted by the first gain adjuster, the signal level of the second analog image-capturing signal having been adjusted by the second gain adjuster and the signal level of the third analog image-capturing signal having been adjusted by the third gain adjuster;
an A/D converter that executes A/D conversion of:
the first analog image-capturing signal to output a first digital image-capturing signal,
the second analog image-capturing signal adjusted by the first gain adjuster to output a second digital image-capturing signal,
the third analog image-capturing signal adjusted by the second gain adjuster to output a third digital image-capturing signal; and
a white balance controller that individually controls the first gain adjuster, the second gain adjuster and the third gain adjuster so as to achieve a predetermined ratio among the individual analog image-capturing signal levels detected by the signal level detector, wherein
the white balance adjuster multiplies each of the first, the second and the third digital image-capturing signals by an adjustment coefficient larger than 1.

8. A white balance adjustment circuit according to claim 7, further comprising:
a color temperature detector that detects the color temperature of the subject; and
an instructing device that issues instructions for the second gain adjuster and the third gain adjuster to perform adjustment in correspondence to the color temperature detected by the color temperature detector.

9. A white balance adjustment circuit according to claim 8, wherein:
when the color temperature detected by the color temperature detector is lower than a predetermined value, the instructing device issues instructions for the second gain adjuster and the third gain adjuster to set respective gains to predetermined initial values and when the color temperature is equal to or higher than the predetermined value, the instructing device issues instructions for the second gain adjuster and the third gain adjuster to set the gains lower than the respective predetermined initial values.

10. A white balance adjustment circuit according to claim 8, further comprising:
a brightness detector that detects a brightness level of the subject, wherein:
when the brightness detected by the brightness detector is equal to or higher than a predetermined brightness value, the instructing device issues an instruction for the first gain adjuster to set a gain adjusted thereby to a predetermined initial value and when the detected brightness level is lower than the predetermined brightness value, the instruction device issues an instruction for the first gain adjuster to set the gain higher than the predetermined initial value.

11. A white balance adjustment circuit according to claim 9, further comprising:
a brightness detector that detects a brightness level of the subject, wherein:
when the brightness detected by the brightness detector is equal to or higher than a predetermined brightness value, the instructing device issues an instruction for the first gain adjuster to set a gain adjusted thereby to a predetermined initial value and when the detected brightness level is lower than the predetermined brightness value, the instruction device issues an instruction for the first gain adjuster to set the gain higher than the predetermined initial value.

12. A white balance adjustment circuit according to claim 7, wherein:
the first color is G color, and one of either the second color or the third color is R color and the other is B color.

13. An image-capturing apparatus having the white balance adjustment circuit according to claim 1.

14. An image-capturing apparatus having the white balance adjustment circuit according to claim 7.

15. A white balance adjustment circuit according to claim 1, wherein:
the white balance adjuster adjusts digital data of the second analog image-capturing signal having been adjusted by the first gain adjuster and digital data of the third analog image-capturing signal having been adjusted by the second gain adjuster.

* * * * *